(12) United States Patent
Craddock

(10) Patent No.: US 8,201,901 B2
(45) Date of Patent: Jun. 19, 2012

(54) SLIDING SUPPORTS

(75) Inventor: Andrew Neil Craddock, Northhampton (GB)

(73) Assignee: Accuride International Limited, Northhampton (GB)

( * ) Notice: Subject to any disclaimer, the term of this patent is extended or adjusted under 35 U.S.C. 154(b) by 785 days.

(21) Appl. No.: 12/063,401

(22) PCT Filed: Aug. 10, 2006

(86) PCT No.: PCT/GB2006/002980
§ 371 (c)(1),
(2), (4) Date: Feb. 26, 2009

(87) PCT Pub. No.: WO2007/017688
PCT Pub. Date: Feb. 15, 2007

(65) Prior Publication Data
US 2010/0164341 A1    Jul. 1, 2010

(30) Foreign Application Priority Data

Aug. 11, 2005 (GB) .................................. 0516522.0
Oct. 28, 2005 (GB) .................................. 0522110.6

(51) Int. Cl.
*A47B 88/00* (2006.01)
(52) U.S. Cl. ......... 312/334.11; 312/334.46; 312/334.44; 312/334.26; 312/334.17
(58) Field of Classification Search ............. 312/334.11, 312/334.13, 334.9, 334.15, 334.17, 334.25–334.26, 312/334.33, 334.38, 334.44–334.46; 384/21
See application file for complete search history.

(56) References Cited

U.S. PATENT DOCUMENTS

| | | | |
|---|---|---|---|
| 3,133,768 A * | 5/1964 | Klakovich | 384/17 |
| 3,589,778 A * | 6/1971 | Olson | 384/21 |
| 3,650,578 A * | 3/1972 | Del Vecchio et al. | 384/18 |
| 3,679,275 A | 7/1972 | Fall et al. | |
| 3,857,618 A | 12/1974 | Hagen et al. | |
| 3,966,273 A * | 6/1976 | Hagen et al. | 384/18 |
| 3,975,063 A | 8/1976 | Mahotka et al. | |
| 4,067,632 A * | 1/1978 | Sekerich | 312/334.9 |
| RE32,134 E | 5/1986 | Gutner | |
| 4,752,142 A * | 6/1988 | Jackson et al. | 384/18 |
| 4,799,802 A * | 1/1989 | Lautenschlager | 384/19 |

(Continued)

FOREIGN PATENT DOCUMENTS

CA         2437147 A1    2/2005

(Continued)

OTHER PUBLICATIONS

International Search Report and Written Opinion for WO 2007/017688 A1.

(Continued)

*Primary Examiner* — Hanh V Tran
(74) *Attorney, Agent, or Firm* — Stephen B. Salai; Brian B. Shaw; Harter Secrest & Emery LLP

(57) ABSTRACT

An apparatus including sliding supports and particularly sliding supports having two elongate members of channel section which slide one within the other. The apparatus addresses the problem of using such sliding supports in an orientation where the channels of the elongate members open vertically rather than horizontally. The sliding support preferably includes a damping mechanism for resisting relative sliding movement of the elongate members. The sliding support also preferably includes a mechanism for defining one or more intermediate positions between extended and shortened positions of the sliding support.

23 Claims, 7 Drawing Sheets

U.S. PATENT DOCUMENTS

| | | | |
|---|---|---|---|
| 4,921,359 A | | 5/1990 | Sakamoto |
| 5,411,333 A | * | 5/1995 | Hoffman ................ 384/18 |
| 5,722,750 A | * | 3/1998 | Chu .................... 312/334.11 |
| 6,386,659 B1 | * | 5/2002 | Muller et al. ........ 312/334.38 |
| 6,499,819 B2 | * | 12/2002 | Hoeppner ............. 312/334.44 |
| 6,805,418 B2 | * | 10/2004 | Milligan ................... 312/333 |
| 6,979,067 B2 | * | 12/2005 | Yang ..................... 312/334.46 |
| 7,029,080 B2 | * | 4/2006 | Barry et al. ............... 312/333 |
| 7,210,752 B2 | * | 5/2007 | Dubon ...................... 312/333 |
| 7,240,977 B2 | * | 7/2007 | He ............................ 312/333 |
| 7,309,115 B2 | * | 12/2007 | Blum et al. ........... 312/334.13 |
| 2001/0008358 A1 | | 7/2001 | Brustle |
| 2003/0067257 A1 | * | 4/2003 | Gasser ...................... 312/331 |
| 2003/0209958 A1 | * | 11/2003 | Hwang et al. ........ 312/334.46 |
| 2005/0218762 A1 | * | 10/2005 | Lammens ............. 312/334.46 |

FOREIGN PATENT DOCUMENTS

| | | |
|---|---|---|
| DE | 2540656 A1 | 3/1976 |
| DE | 8228143 U1 | 1/1983 |
| DE | 102004001568 A1 | 8/2005 |
| EP | 0226389 A2 | 6/1987 |
| EP | 1120065 A2 | 8/2001 |
| FR | 471130 A | 10/1914 |
| GB | 1 512 069 | 5/1978 |
| GB | 2079145 A | 1/1982 |
| GB | 2 168 597 A | 6/1986 |
| GB | 2168597 A | 6/1986 |
| GB | 2233215 A | 1/1991 |
| GB | 2245157 A | 1/1992 |
| JP | 51-48046 | 4/1976 |
| JP | 61-146208 | 7/1986 |
| JP | 9196061 A | 7/1997 |
| JP | 2004 084945 A | 3/2004 |
| WO | 0239850 A2 | 5/2002 |
| WO | 2005003636 A | 1/2005 |

OTHER PUBLICATIONS

English translation of Japanese Office Action dated Aug. 30, 2011 in Japanese Patent Application No. 2008-525638 (3 pages).

* cited by examiner

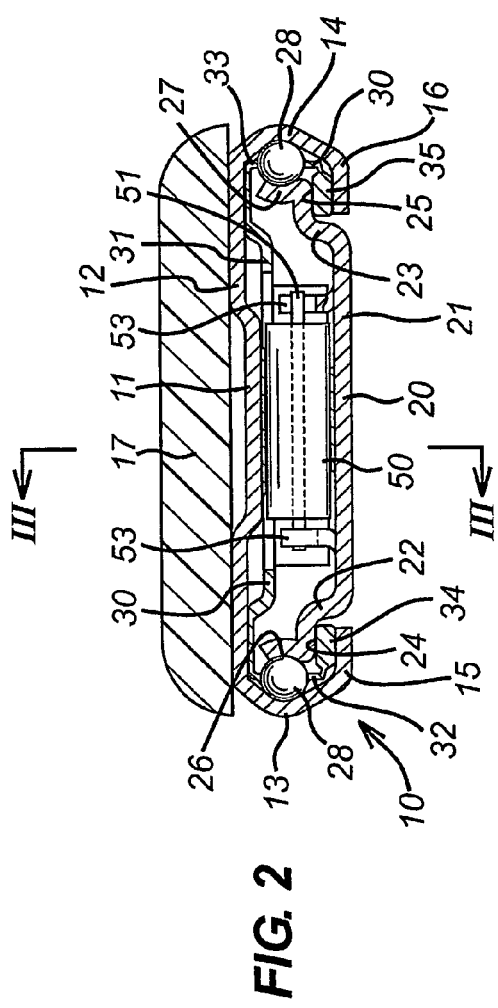
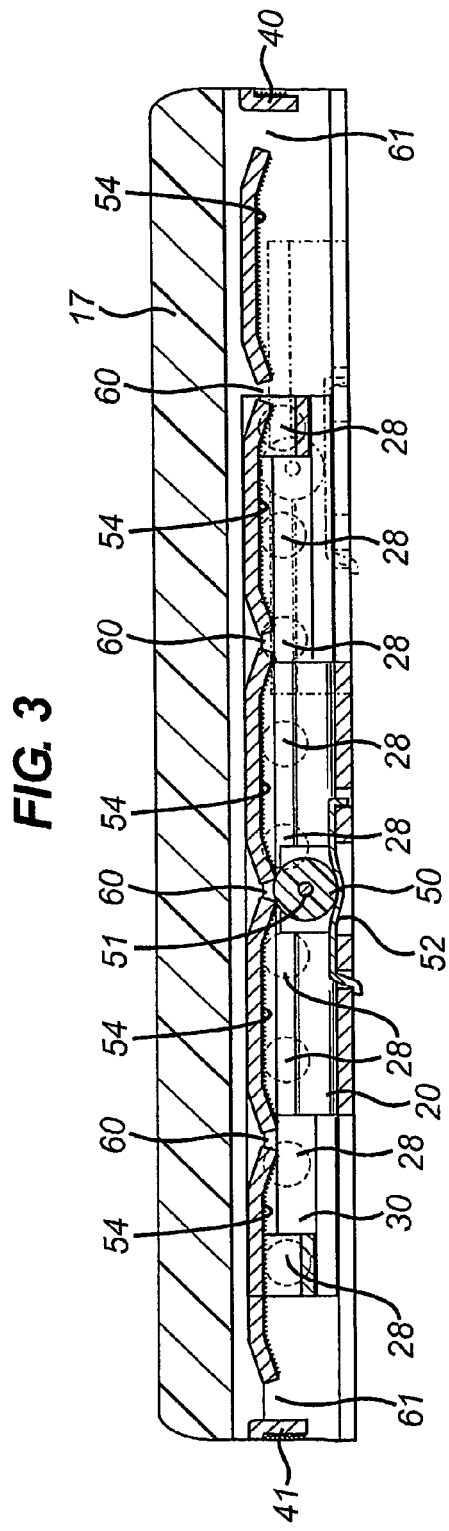
FIG. 2
FIG. 3

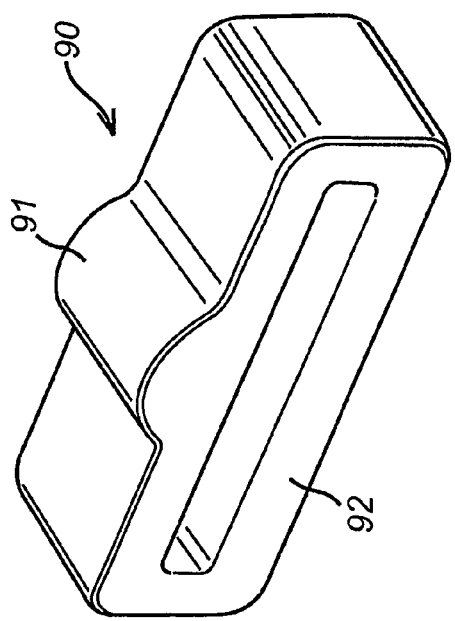
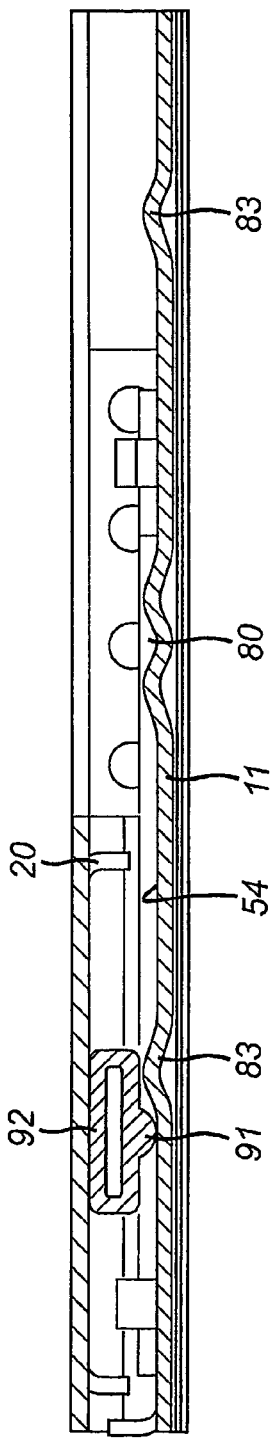

SLIDING SUPPORTS

The invention relates to sliding supports.

It is known to provide sliding supports for drawers, such sliding supports having two (or more) elongate members, typically of shallow channel section, which slide one within the other, one of the members being secured to the drawer and the other to the frame or housing in which the drawer is supported. Sliding engagement between the members is typically provided by ball bearings retained by a retaining member located between the two elongate members.

In an arrangement for supporting drawers, where a sliding support, having a pair of sliding members as outlined above, is arranged on each side of the drawer, the sliding support is arranged with the channels of the members opening horizontally partly because this takes up little lateral space, and partly because the sliding support is designed to bear vertical load in this orientation.

A problem of mutual disengagement of the elongate members arises if sliding supports of this type are used with the channels of the elongate members opening vertically rather than horizontally. Such an orientation would be required if the sliding support is to be used to provide sliding support underneath a body, with one of the channels mounted on an underside of the body and the other channel secured to whatever the body is to slide on. Sliding supports of this type are useful in such a situation, because they are dimensionally compact in the direction in which the channels open, but have hitherto been unusable because of member disengagement problems in any situation where a load at one end of the support, when extended, would cause a moment urging the inner slide member out of engagement with the outer slide member.

According to the invention, there is provided a sliding support comprising a first elongate slide member of channel section, a second elongate slide member slidable in the channel defined by the first slide member, and locating means positioned between the first and second slide members to locate and align the first and second slide members for sliding without contact therebetween, the channel section of the first slide member having a base, side walls extending from the base, and a retaining lip extending from each side wall partly across the channel section opening to define an elongate gap between the two lips, the gap between the two lips and the lateral dimension of the second slide member being such that, in the absence of the locating means such that the second member contacts one channel side wall of the first member, the second member is retained in the first channel by the lip extending towards the channel side wall with which the second member is in contact.

According to a further aspect of the invention, there is provided a sliding support comprising a first elongate slide member of channel section, a second elongate slide member slidable in the channel defined by the first slide member, and locating means positioned between the first and second slide members to locate and align the first and second slide members for sliding without contact therebetween, the channel section of the first slide member having a base, side walls extending from the base, and a retaining lip extending from each side wall partly across the channel section opening to define a gap between the two lips, engagement surfaces of the second member and the lips of the first member being parallel.

The sliding support preferably includes a damping mechanism for resisting relative sliding movement of the first and second slide members.

The damping mechanism may include a friction member mounted on one of the slide members and movably biased towards the other slide member, the other slide member including a surface along which the friction member can ride as the slide members slide relative to one another.

The friction member may be rotatably mounted. The friction member is preferably a roller, and the roller is preferably mounted on a spring member to provide bias towards the surface. The surface may be knurled. The roller is preferably formed from rubber.

Alternatively, the friction member may comprise a polyurethane member having a protrusion for riding along the surface of the other slide member. Polyurethane offers the advantages of durability, resistance to wear, stability within large temperature ranges and self lubrication. Preferably a rubber polyurethane with a Shore hardness of 90 is used. By using such a friction member the effort required to slide the slide members relative to one another stays substantially constant with use.

In a preferred embodiment, the friction member has a cross section comprising a hollow rectangle with a smooth protrusion formed from a fragment of a circle formed on a first side thereof.

Alternatively, the friction member may comprise a first member having a sprung portion for riding along the surface of the other slide portion.

Alternatively, the damping mechanism may comprise a rotary damper, for example an oil-filled rotary damper.

Preferably, the sliding support includes a mechanism for defining one or more intermediate positions between extended and shortened positions of the sliding support.

The intermediate position defining mechanism may include the friction member and the surface, the surface including one or more discontinuities, the or each discontinuity providing a stable position for the friction member to rest.

The or each surface discontinuity may be a gap between ramp portions in the surface, the arrangement being such that the friction member rides up a ramp portion until it engages the gap, and is movable out of the gap if a threshold force is applied to cause further relative movement of the slide members.

Alternatively, the or each surface discontinuity may be an indentation formed in the surface, the arrangement being such that the friction member rides down into the bottom of the indentation, and is movable out of the indentation if a threshold force is applied to cause further relative movement of the slide members.

In a preferred embodiment, the indentation may be formed by a first pair of ramped surfaces extending from the plane of the surface to below the plane of the surface. With this embodiment, no increase in effort is required to cause the friction member to ride into the indentation.

In another preferred embodiment, the indentation may be formed by a first pair of ramped surfaces extending above the plane of the surface, and a second pair of ramped surfaces separating the first pair of ramped surfaces and also extending above the plane of the surface. With this embodiment, an increase in effort is required to cause the friction member to ride up the first pair of ramped surfaces and into the indentation.

In a more preferred embodiment, the indentation may be formed by a first pair of ramped surfaces extending above the plane of the surface, and a second pair of ramped surfaces separating the first pair of ramped surfaces and extending from above to below the plane of the surface. The gradient of the first pair of ramped surfaces is preferably shallower than the gradient of the second pair of ramped surfaces. With this embodiment, a small increase in effort is required to cause the friction member to ride up the first pair of ramped surfaces. When a small increase in effort is required to ride the member into the indentation, the possibility of the user thinking the slide has reached an end of its travel when it has merely reached an intermediate surface discontinuity is reduced.

The locating means may comprise a plastics strip, preferably of self-lubricating plastics material, arranged between the first slide member and the second slide member on each side of the second slide member to locate slidingly the second slide member within the first slide member.

Each plastics strip preferably includes an elongate spacer element located between the associated lip of the first slide member and second slide member.

Alternatively, and preferably, the locating means may comprise a multiplicity of ball bearings and a retainer for retaining the ball bearings in two parallel rows, one row on each side of the second slide member, between the second slide member and the first slide member, to locate slidingly the second slide member within the first slide member.

The profile of the second slide member within the first slide member preferably includes a ball engaging channel at each side thereof which faces outwardly towards the first slide member, the ball channels facing away from one another.

The ball retainer preferably includes a spaced apart pair of elongate spacer elements, each spacer elements being located between the associated lip of the first member and the second member. The ball retainer is preferably of polymeric material.

By way of example, embodiments of a sliding support, and a modification thereof, according to the invention will now be described with reference to the accompanying drawings, in which:

FIG. 2 is a sectional view along the lines II-II in FIG. 1;

FIG. 3 is a sectional view along the lines in FIG. 2, with the sliding support;

FIG. 8 is a perspective view showing a friction member of a sliding support according to the invention.

FIG. 9 is a sectional view showing a sliding support according to the invention modified by using the friction member of FIG. 8 as a damping mechanism to damp relative sliding movement of the slide members.

FIG. 1 shows a perspective view, from below, of an embodiment of a sliding support generally indicated at 10.

Figure 1:
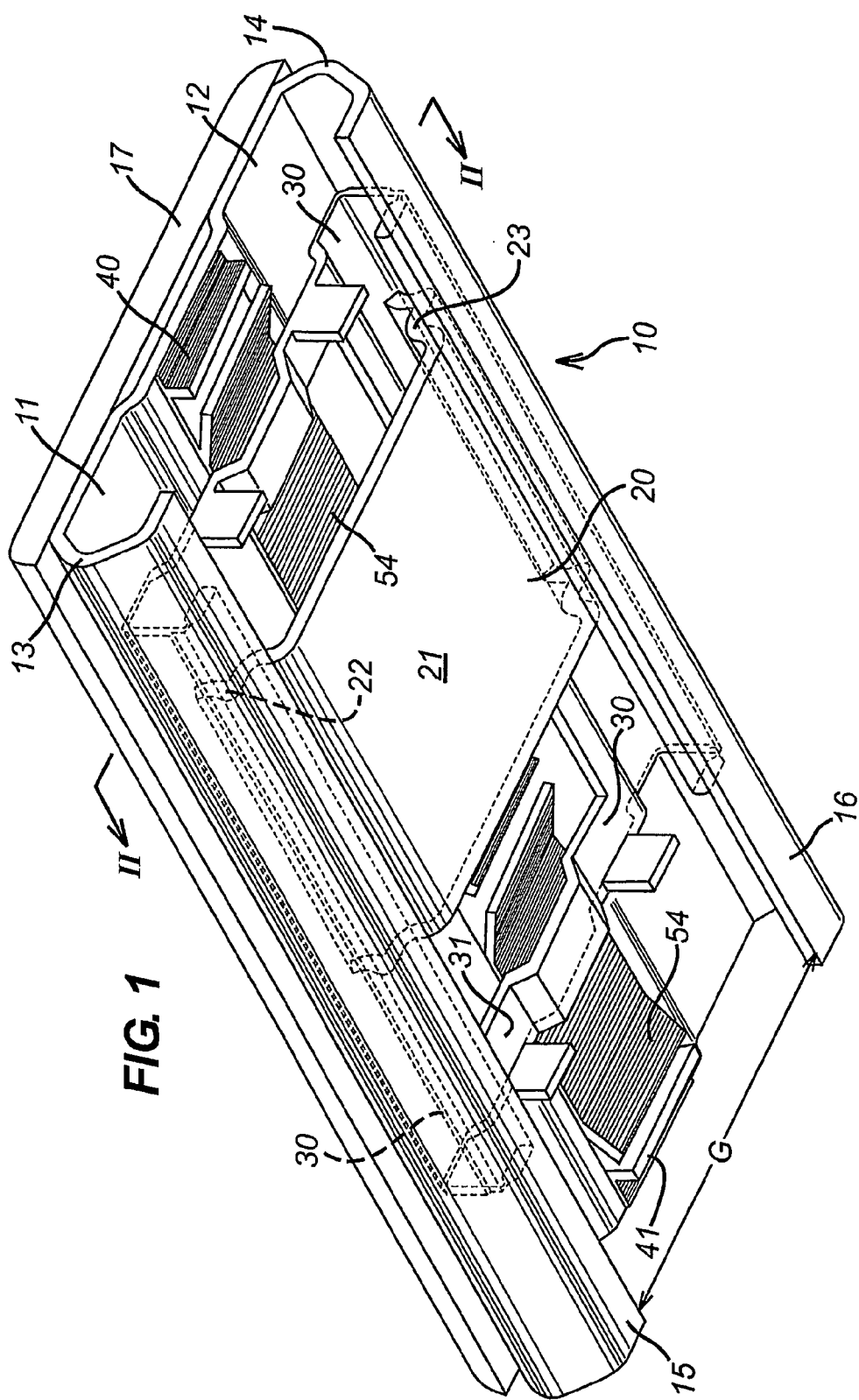
FIG. 1 is a perspective view of a sliding support according to the invention.
Figure 4:
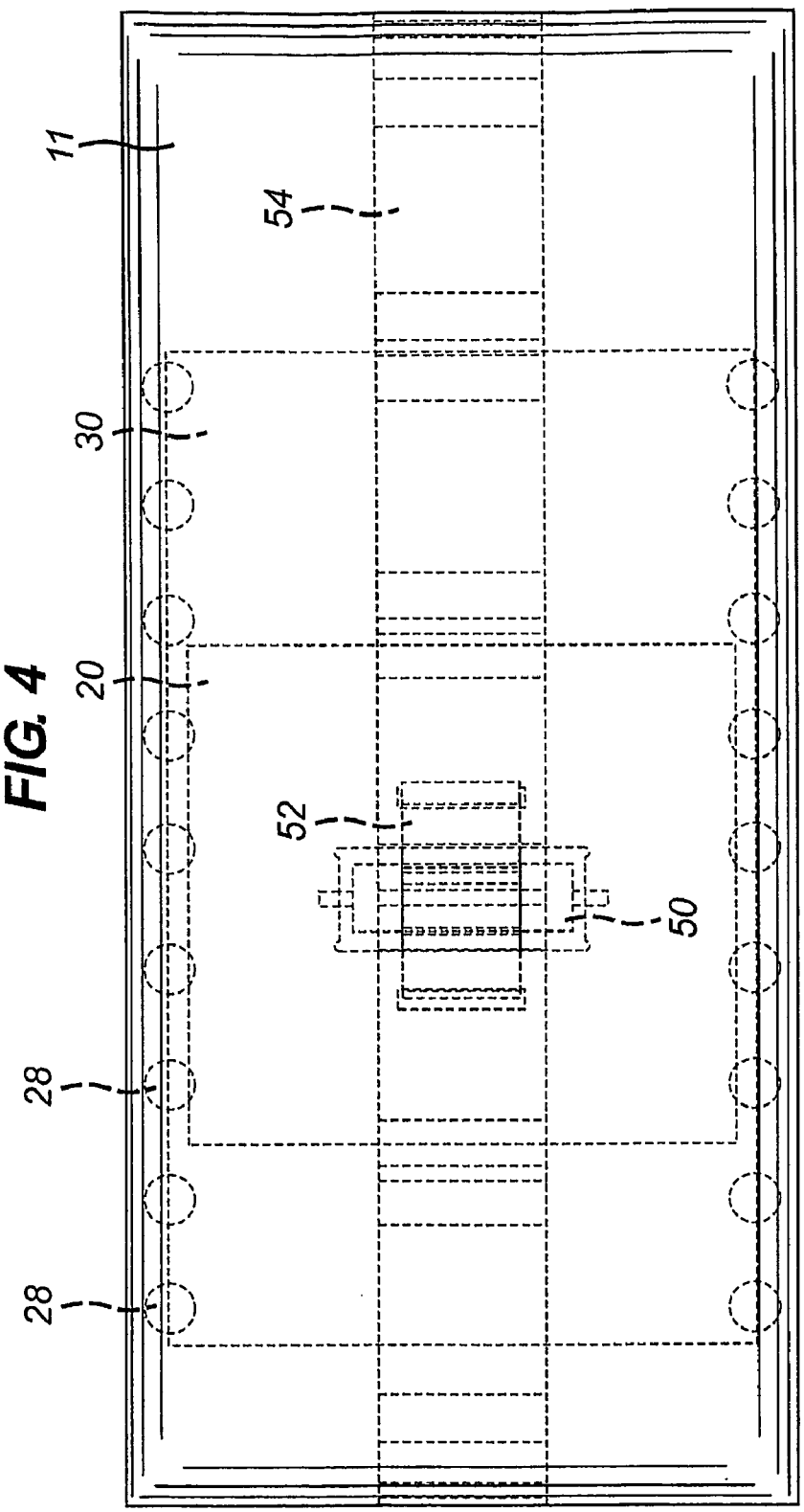
FIG. 4 is a plan view of the sliding support of FIGS. 1 to 3.

The sliding support 10 has a first, outer slide member 11, made of mild steel (or other suitable material) formed into a channel profile with a base 12, side walls 13 and 14 extending from the base 12 and lips 15 and 16 extending towards one another from the side walls 13 and 14 respectively. The edges of the lips 15 and 16 define a gap G therebetween.

The first slide member 11 supports, in this example, an armrest shown schematically at 17 secured to the first slide member 11 by screws, or alternative means (not shown).

Engaged slidingly within the first slide member 11 is a second, inner slide member 20, also of mild steel (or other suitable material). The second slide member is also of channel section with a base 21, and side walls 22 and 23. As can be seen more readily in the sectional view in FIG. 2, the side walls 22 and 23 are both stepped in profile to provide load surfaces 24 and 25 respectively parallel to the lips 15 and 16 of the first member 11. The side walls 22 and 23 include curved ball engagement profiles 26, 27 respectively in which ball bearings 28 run.

The ball bearings are retained by a retainer 30 of polymeric material (for example material sold under the registered trade mark Nylon 66). The retainer 30 has a base 31, extending between the bases 12 and 21 of the first and second slide members, and side webs 32, 33 which both carry a series of holes of a size to be engaged by and retain the ball bearings 30. The arrangement for ball bearing retention is best seen in the sectional view in FIG. 2.

The side webs 32, 33 are formed with spacer elements 34, 35 respectively, flexibly connected thereto, the spacer elements 34, 35 lying between, respectively, lip 15 and surface 24 and lip 16 and surface 25 to maintain proper alignment therebetween. With this arrangement, the ball bearings 30 maintain lateral alignment and spacing of the slide members 11 and 20, enabling relative sliding movement therebetween.

An alternative to a ball bearing arrangement is for shaped strips of self-lubricating plastics material to be engaged between the side walls of the two slide members 11, 20, the strips also being formed with spacer elements of a profile similar to those of the spacer elements 34, 35 already described.

In the arrangement and orientation shown, the sliding support 10 is for supporting slidably an armrest 17, but equally any element or body required to be linearly movably mounted. The second slide member 20 is fixedly mounted (not shown) on the body or structure in relation to which the armrest (or other body or element) is to be slidable linearly. The armrest 17 is thus able to slide above the second slide member 20 until constrained by end stops 40, 41 extending from the base 12 of the first slide member 11. It will be appreciated that the configuration could be reversed, with the first, outer slide member below the second, inner slide member. The arrangement best suited to a particular application will be used.

In order to provide a degree of resistance to relative sliding movement of the slide members 11 and 20, a motion damping mechanism is included. The damping mechanism includes a roller 50 of plastics material mounted rotatably on an axle 51 supported on a leaf spring 52 by legs 53. The leaf spring 52 is mounted on the second slide member 20 and a recess is provided in the base 21 of the second slide member to allow for movement of the leaf spring therethrough.

The leaf spring biases the roller towards the first slide member 11, the base 12 of the first slide member 11 being provided with a knurled surface 54 such that there is frictional resistance to relative sliding movement of the slide parts 11 and 20 due to contact between the roller 50 and the surface 54. It will be appreciated that the surface 54 could be textured or otherwise treated to provide a degree of frictional resistance.

Additionally, as can be seen in FIGS. 1 and 3, gaps 60 are formed in the surface 54 to provide intermediate, defined positions for the armrest (in this case) to lie. The surface 54 is ramped on each side of each gap 60 to accentuate the sensation of defining the intermediate position as the armrest is slid. The user feels smooth movement, an increase in resistance as the roller rides up a ramp portion, then a stable, defined position when the roller 50 engages a gap 60.

Increased force applied to the armrest will enable the roller to be raised from the gap 60 and to move further along the surface 54.

Additionally, there is a gap 61 adjacent each end stop 40, 41 to provide a retention force in either end position.

As can be seen in the perspective view in FIG. 1, and the sectional side view in FIG. 3, the first slide member 11 is significantly longer than the second slide member. Where the first slide member is extended out in cantilever fashion, there is potential for significant load to be applied (in the case of a vehicle armrest, the assumption is that someone might sit on the extended armrest by mistake) and if applied to the unsupported end, a significant movement will be applied about the end of the second slide member nearest the cantilever end of the first slide member. A conventional drawer slide would fail in such a situation, because the side walls of the first slide member extend only just beyond the point where ball bearing retention is provided. The present embodiment is designed not to fail even if the ball bearing arrangement fails and the second slide member is able to move laterally towards and with engagement with the first member side wall. Even then, it is not possible to remove the second slide member 20 through the gap G between the lips 15 and 16 of the first slide member 11.

It will be appreciated that this embodiment of slide support could be used to support slidingly a variety of bodies other than an armrest; reference to an armrest is merely by way of example.

Figure 5:
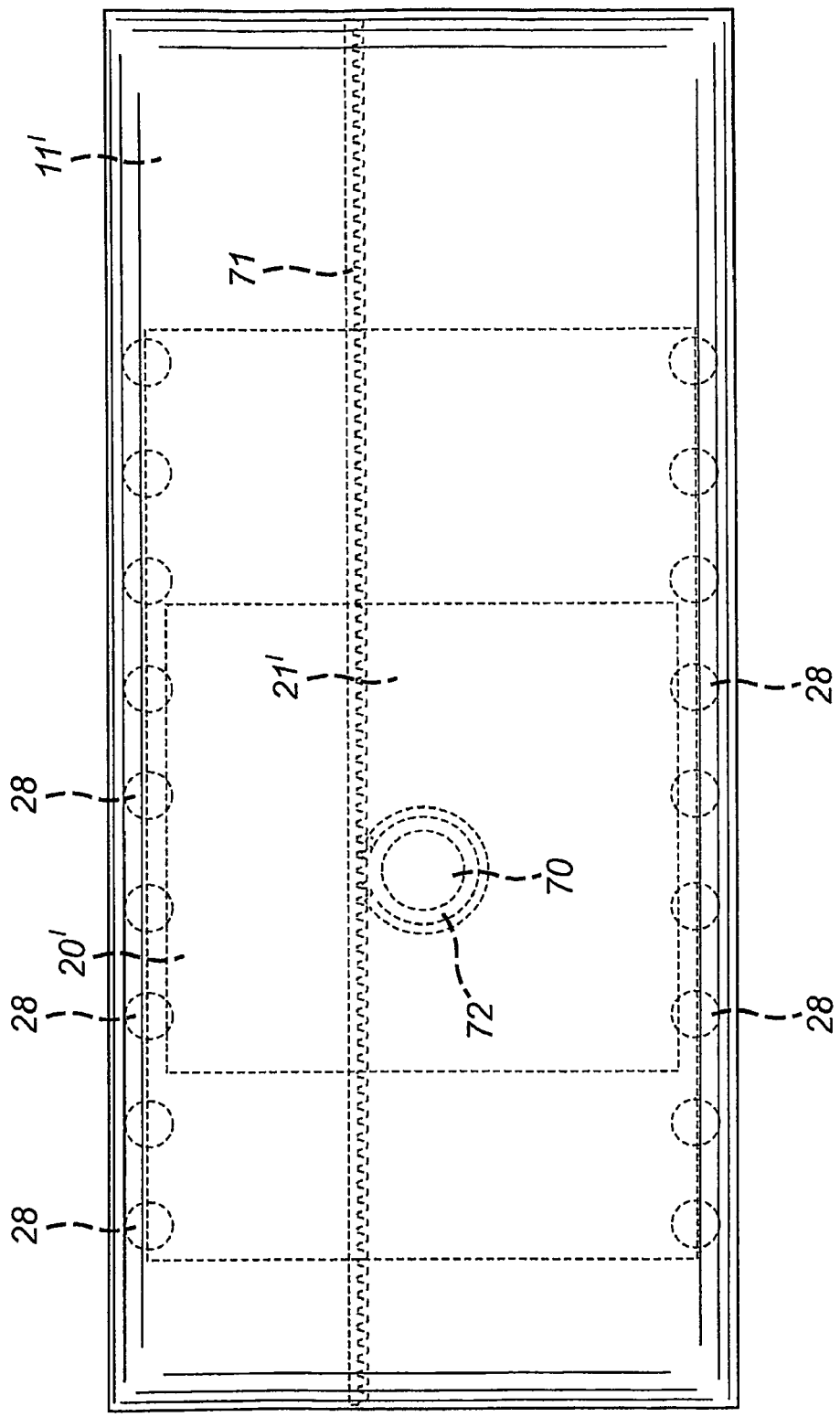
FIG. 5 is a schematic plan view showing a sliding support according to the invention modified by using a rotary damper to damp relative sliding movement of the slide members.

FIG. 5 shows schematically an alternative form of damping mechanism. Where the roller, leaf spring and knurled surface are replaced by an oil-filled rotary damper 70 mounted on the second slide member 20' for rotation about an axis normal to the plane of the base 21'. The damper 70 has a sphired wheel 72 and engages in a toothed rack 71 mounted along the length of the first member 11'. Relative sliding movement of the first and second slide members 11' and 20' causes the wheel 72 to rotate about its axis due to movement along the rack 71 and experience a resistive force due to the damped wheel 72.

Figure 6:
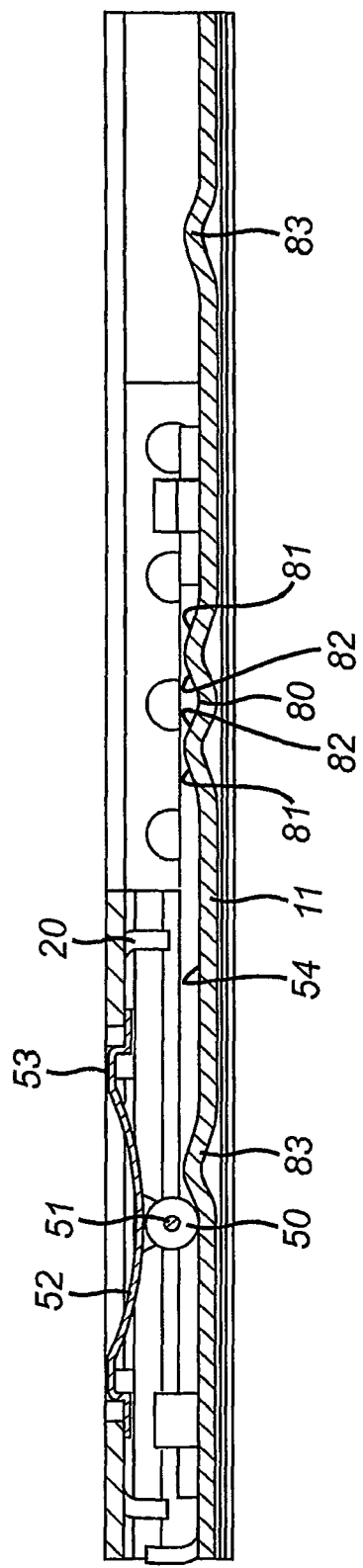
FIG. 6 is a sectional view showing a sliding support according to the invention modified by using an alternative damping mechanism to damp relative sliding movement of the slide members.

FIG. 6 shows an alternative form of damping mechanism, where the knurled surface with gaps is replaced by a surface 54 having an indentation 80 as a surface discontinuity. The indentation 80 is formed by a first pair of ramped surfaces 81 extending above the plane of the surface, and a second pair of ramped surfaces 82 separating the first pair of ramped surfaces 81 and also extending above the plane of the surface 54. Relative sliding movement of the first and second slide members 11, 20 causes the roller 50 to rotate about its axis and ride into the bottom of the indentation 80. If a threshold force is applied, the roller 50 rides out of the indentation 80 and further relative movement of the slide members 11, 20 occurs.

Additionally, there is a protrusion 83 adjacent each end stop to provide a retention force in either end position.

Figure 7:
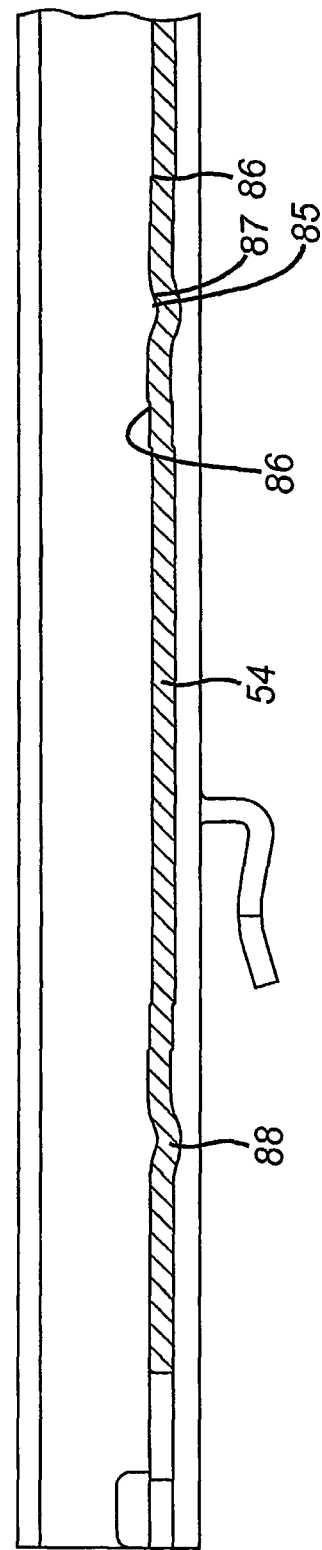
FIG. 7 is a sectional view showing a slide member of a sliding support according to the invention.

FIG. 7 shows an alternative form of damping mechanism, where the knurled surface with gaps is replaced by an alternative surface 54 having an indentation 85 as a surface discontinuity. The indentation 85 is formed by a first pair of ramped surfaces 86 extending above the plane of the surface, and a second pair of ramped surfaces 87 separating the first pair of ramped surfaces 86 and extending from above to below the plane of the surface 54. The gradient of the first pair of ramped surfaces 86 is shallower than the gradient of the second pair of ramped surfaces 87. Therefore, a small increase in effort is required to cause the roller to ride up the first pair of ramped surfaces 86. Relative sliding movement of the first and second slide members 11, 20 causes the roller to rotate about its axis and ride into the bottom of the indentation 85. If a threshold force is applied, the roller rides out of the indentation 85 and further relative movement of the slide members occurs.

Additionally, there is an indentation 88 adjacent each end stop to provide a retention force in either end position.

FIG. 8 shows an alternative friction member 90 which can be used in any of the embodiments shown in FIG. 1 to 4, 6 or 7. For example, see FIG. 9. The friction member 90 is for mounting on one of the slide members 11, 20 and comprises a polyurethane member having a protrusion 91 for riding along the surface of the other slide member. Preferably a rubber polyurethane with a Shore hardness of 90 is used. By using such a friction member the effort required to slide the slide members relative to one another stays substantially constant with use. The friction member has a cross section comprising a hollow rectangle 92 with a smooth protrusion 91 formed from a fragment of a circle formed on a first side thereof. The protrusion is biased towards the surface of the other slide member, and contact between the protrusion 91 and the surface 54 causes frictional resistance to relative sliding movement of the slide parts 11 and 20.

Figure 10:
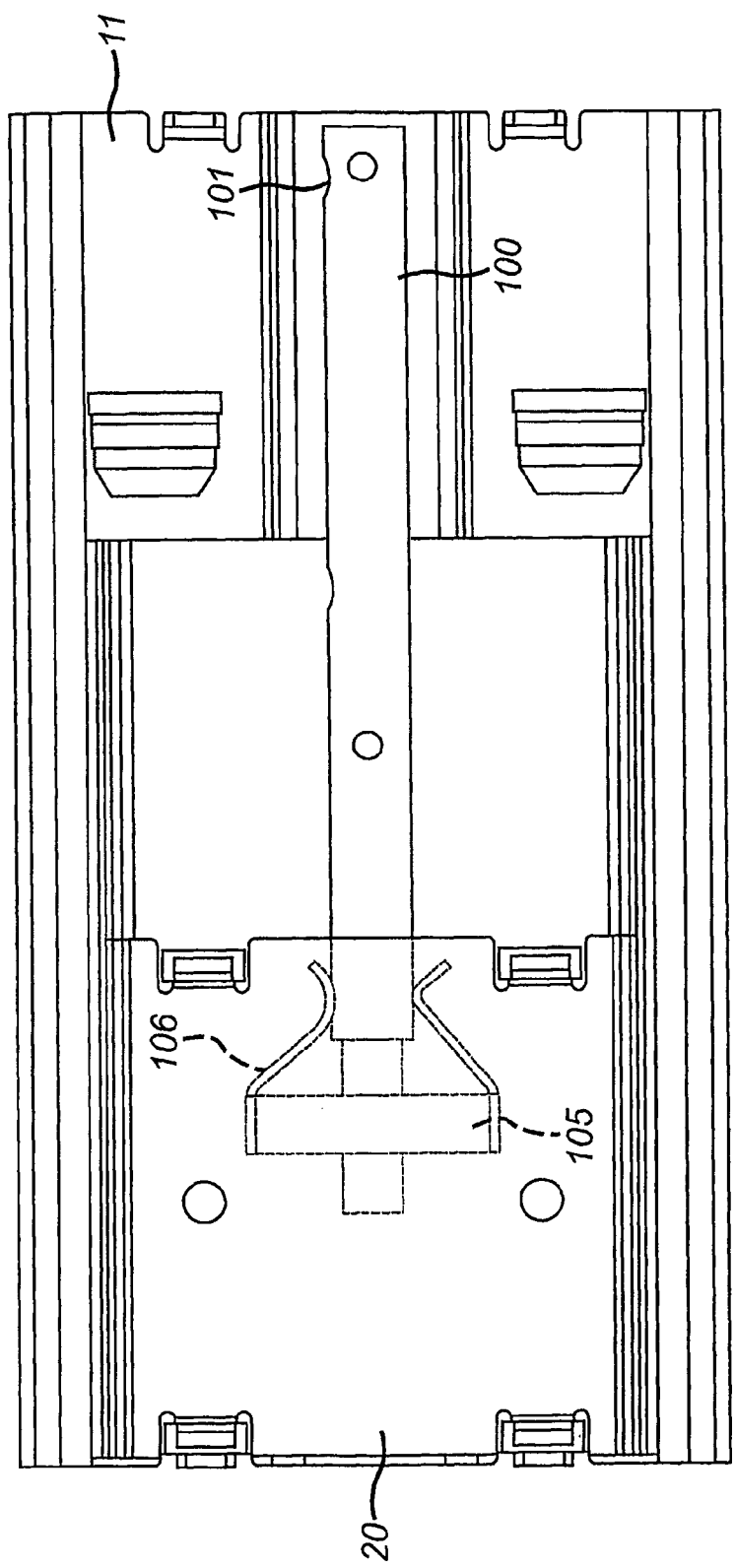
FIG. 10 is a schematic plan view showing a sliding support according to the invention modified by using an alternative damping mechanism to damp relative sliding movement of the slide members.

FIG. 10 shows an alternative form of damping mechanism, where the roller, leaf spring and knurled surface are replaced by a first member 100 attached to one of the slide members 11, 20, the first member 100 having a number of indentations 101 formed therein, and a second member 105 attached to the other of the two slide members 11, 20 and having a sprung portion 106 for engagement with the indentations 101 formed in the first member 100. Relative sliding movement of the first and second slide members 11, 20 causes the sprung portion 106 of the second member 105 to ride along the first member 100 and engage an indentation 101 formed in the first member 100. If a threshold force is applied, the sprung member 106 rides out of the indentation 101 and further relative movement of the slide members 11, 20 occurs.

It will be appreciated that the embodiment and modification thereto are by way of example only, and that alterations or modifications may be made within the scope of the invention as defined in the appended claims.

The invention claimed is:

1. A sliding support comprising a first elongate slide member of channel section, a second elongate slide member slidable in the channel defined by the first slide member, and locating means positioned between the first and second slide members to locate and align the first and second slide members for sliding without contact therebetween, the channel section of the first slide member having a base, side walls extending from the base, and a retaining lip extending from each side wall partly across the channel section opening to define an elongate gap between the two lips, the gap between the two lips and the lateral dimension of the second slide member each having a length such that, in the absence of the locating means such that the second slide member contacts one channel side wall of the first slide member, the second slide member remains retained in the first channel by the lip extending towards the channel side wall with which the second slide member is in contact, wherein:

(a) the second slide member is of channel second with a base and side walls, each side wall of the second slide member being stepped in profile to provide a pair of load surfaces which are respectively parallel the retaining lips of the first slide member, a ball engaging channel at each side thereof which extends substantially perpendicular to the base from the load surface and faces outwardly towards the side wall of the first slide member, the ball channels facing away from one another;

(b) the location means comprises a multiplicity of ball bearings and a retainer of channel section with a base and side walls for retaining the ball bearings in two parallel rows, one row on each side of the second slide member, between the second slide member and the first slide member, to locate slidingly the second slide member within the first slide member, and (c) the ball bearing retainer includes a spaced apart pair of elongate spacer elements, each spacer element being located between the associated lip of the first slide member and the respective load surface of the second slide member.

2. A sliding support as claimed in claim 1 wherein the sliding support includes a damping mechanism for resisting relative sliding movement of the first and second slide members.

3. A sliding support as claimed in claim 2 wherein the damping mechanism includes a friction member mounted on one of the slide members and movably biased towards the other slide member, the other member including a surface along which the friction member can ride as the slide members slide relative to one another.

4. A sliding support as claimed in claim 3 wherein the friction member is rotatably mounted.

5. A sliding support as claimed in claim 3 wherein the friction member is a roller.

6. A sliding support as claimed in claim 5 wherein the roller is mounted on a spring member to provide bias towards the surface.

7. A sliding support as claimed in claim 3 wherein the friction member comprises a polyurethane member having a protrusion for riding along the surface of the other slide member.

8. A sliding support as claimed in claim 7 wherein the polyurethane member is formed from a rubber polyurethane having a Shore harness of 90.

9. A sliding support as claimed in claim 7 wherein the friction member has a cross section comprising a rectangle with a smooth protrusion formed from a fragment of a circle formed on a first side thereof.

10. A sliding support as claimed in claim 3 wherein the friction member comprises a member having a sprung portion for riding along the surface of the other slide member.

11. A sliding support as claimed in claim 3 wherein the surface is knurled.

12. A sliding support as claimed in claim 2 wherein the damping mechanism comprises a rotary damper.

13. A sliding support as claimed in claim 1 wherein the sliding support includes a mechanism for defining one or more intermediate positions between extended and shortened positions of the sliding support.

14. A sliding support as claimed in claim 13 wherein the intermediate position defining mechanism includes a friction member rotatably mounted on one of the slide members and movably biased towards the other slide member, the other slide member including a surface, the surface including one or more discontinuities, the or each discontinuity providing a stable position for the friction member to rest.

15. A sliding support as claimed in claim 14 wherein the friction member is a roller.

16. A sliding support as claimed in claim 14 wherein the or each surface discontinuity is a gap in the surface, the arrangement being such that the friction member rides along the surface until it engages the gap, and is movable out of the gap if a threshold force is applied to cause further relative movement of the slide members.

17. A sliding support as claimed in claim 14 wherein the or each surface discontinuity is an indentation formed in the surface, the arrangement being such that the friction member rides along the surface until it engages the indentation, and is movable out of the indentation if a threshold force is applied to cause further relative movement of the slide members.

18. A sliding support as claimed in claim 17 wherein the indentation is formed by a first pair of ramped surfaces extending from the plane of the surface to below the plane of the surface.

19. A sliding support as claimed in claim 14 wherein the surface has ramp portions on each side of the or each surface discontinuity.

20. A sliding support as claimed in claim 17 wherein the indentation is formed by a first pair of ramped surfaces extending above the plane of the surface, and a second pair of ramped surfaces separating the first pair of ramped surfaces and extending above the plane of the surface.

21. A sliding support as claimed in claim 17 wherein the indentation is formed by a first pair of ramped surfaces extending above the plane of the surface, and a second pair of ramped surfaces separating the first pair of ramped surfaces and extending from above to below the plane of the surface.

22. A sliding support as claimed in claim 21 wherein the gradient of the first pair of ramped surfaces is shallower than the gradient of the second pair of ramped surfaces.

23. A sliding support as clamed in claim 1 wherein the ball bearing retainer is of polymeric material.

* * * * *